(12) United States Patent
Lipchin et al.

(10) Patent No.: US 12,249,151 B2
(45) Date of Patent: Mar. 11, 2025

(54) CROWD ANOMALY DETECTION

(71) Applicant: MOTOROLA SOLUTIONS, INC., Chicago, IL (US)

(72) Inventors: Aleksey Lipchin, Newton, MA (US); Maksim Bolonkin, Waltham, MA (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 18/512,904

(22) Filed: Nov. 17, 2023

(65) Prior Publication Data

US 2024/0404290 A1 Dec. 5, 2024

Related U.S. Application Data

(63) Continuation-in-part of application No. 18/325,650, filed on May 30, 2023.

(51) Int. Cl.
*G06V 20/00* (2022.01)
*G06T 7/20* (2017.01)
(Continued)

(52) U.S. Cl.
CPC ............... *G06V 20/53* (2022.01); *G06T 7/20* (2013.01); *G06V 10/34* (2022.01); *G06V 10/50* (2022.01);
(Continued)

(58) Field of Classification Search
None
See application file for complete search history.

(56) References Cited

U.S. PATENT DOCUMENTS

| | | | |
|---|---|---|---|
| 9,183,512 B2 | 11/2015 | Lehmann et al. | |
| 10,726,956 B2* | 7/2020 | Jiang | A61B 5/01 |
| 12,100,216 B2* | 9/2024 | Kudo | G06V 20/52 |
| 2009/0222388 A1* | 9/2009 | Hua | G06N 5/02 |
| | | | 382/103 |

(Continued)

FOREIGN PATENT DOCUMENTS

| | | |
|---|---|---|
| CA | 3135393 A1 | 10/2020 |
| CN | 103839065 A | 6/2014 |
| CN | 109241845 A | 1/2019 |

OTHER PUBLICATIONS

Bhuiyan, et al., "Video analytics using deep learning for crowd analysis: a review," Multimedia Tools and Applications, Published Mar. 29, 2022, (28 pages).

(Continued)

*Primary Examiner* — Daniel T Tekle
(74) *Attorney, Agent, or Firm* — Michael Best & Friedrich LLP

(57) ABSTRACT

Examples provide a video security system including an electronic processor configured to detect an anomaly by obtaining video data captured using an image sensor and determining a number of people detected in each of a plurality of frames of the video data. For each moment t, the electronic processor determines an average number of people n over a time interval (t−Δt1, t), where Δt1 is greater than or equal to the moment t. For each non-overlapping time interval Δt1, the electronic processor updates a histogram based on the average number of people for the time interval Δt1. In response to determining, using the histogram, that the probability ρ of the average number of people n over the time interval (t−Δt1, t) is less than a threshold probability ρ*, the electronic processor generates an alert indicating that an anomalous crowd size is detected.

21 Claims, 12 Drawing Sheets

(51) Int. Cl.
*G06V 10/34* (2022.01)
*G06V 10/50* (2022.01)
*G06V 20/40* (2022.01)
*G06V 20/52* (2022.01)
*G08B 31/00* (2006.01)

(52) U.S. Cl.
CPC .............. *G06V 20/41* (2022.01); *G08B 31/00* (2013.01); *G06T 2207/30232* (2013.01); *G06T 2207/30242* (2013.01)

(56) References Cited

U.S. PATENT DOCUMENTS

| | | | | |
|---|---|---|---|---|
| 2010/0316257 A1* | 12/2010 | Xu | ........................ | G06V 10/255 382/103 |
| 2010/0322516 A1* | 12/2010 | Xu | ........................ | G06V 20/53 382/173 |
| 2011/0115920 A1* | 5/2011 | Wang | ................ | H04N 23/6811 348/169 |
| 2014/0161315 A1* | 6/2014 | Ostrovsky-Berman | ...................... | G06F 40/103 382/103 |
| 2015/0313530 A1* | 11/2015 | Kodra | .................... | G06V 20/41 382/203 |
| 2016/0140399 A1* | 5/2016 | Yano | ...................... | G06T 7/521 382/103 |
| 2018/0046778 A1* | 2/2018 | Jiang | ........................ | A61B 5/01 |
| 2021/0110145 A1 | 4/2021 | Alcock et al. | | |
| 2022/0138475 A1* | 5/2022 | Chowdhury | ......... | G06V 10/751 382/103 |
| 2022/0254162 A1* | 8/2022 | Felemban | .............. | G06V 20/49 |
| 2022/0262121 A1* | 8/2022 | Iqbal | ...................... | G06V 40/20 |
| 2023/0101369 A1* | 3/2023 | Hirata | .............. | G08B 13/19602 340/521 |
| 2023/0386216 A1* | 11/2023 | Kudo | .................... | G06V 20/52 |
| 2024/0087328 A1* | 3/2024 | Kajiki | .................. | G06V 40/174 |
| 2024/0144490 A1* | 5/2024 | Chan | ........................ | G06T 7/269 |
| 2024/0161496 A1* | 5/2024 | Latapie | .................. | G06V 40/10 |

OTHER PUBLICATIONS

Sinha, et al., "A Survey and analysis of Crowd Anomaly Detection Techniques," IEEE, 2021 Third International Conference on Intelligent Communication Technologies and Virtual Mobile Networks, (5 pages).

* cited by examiner

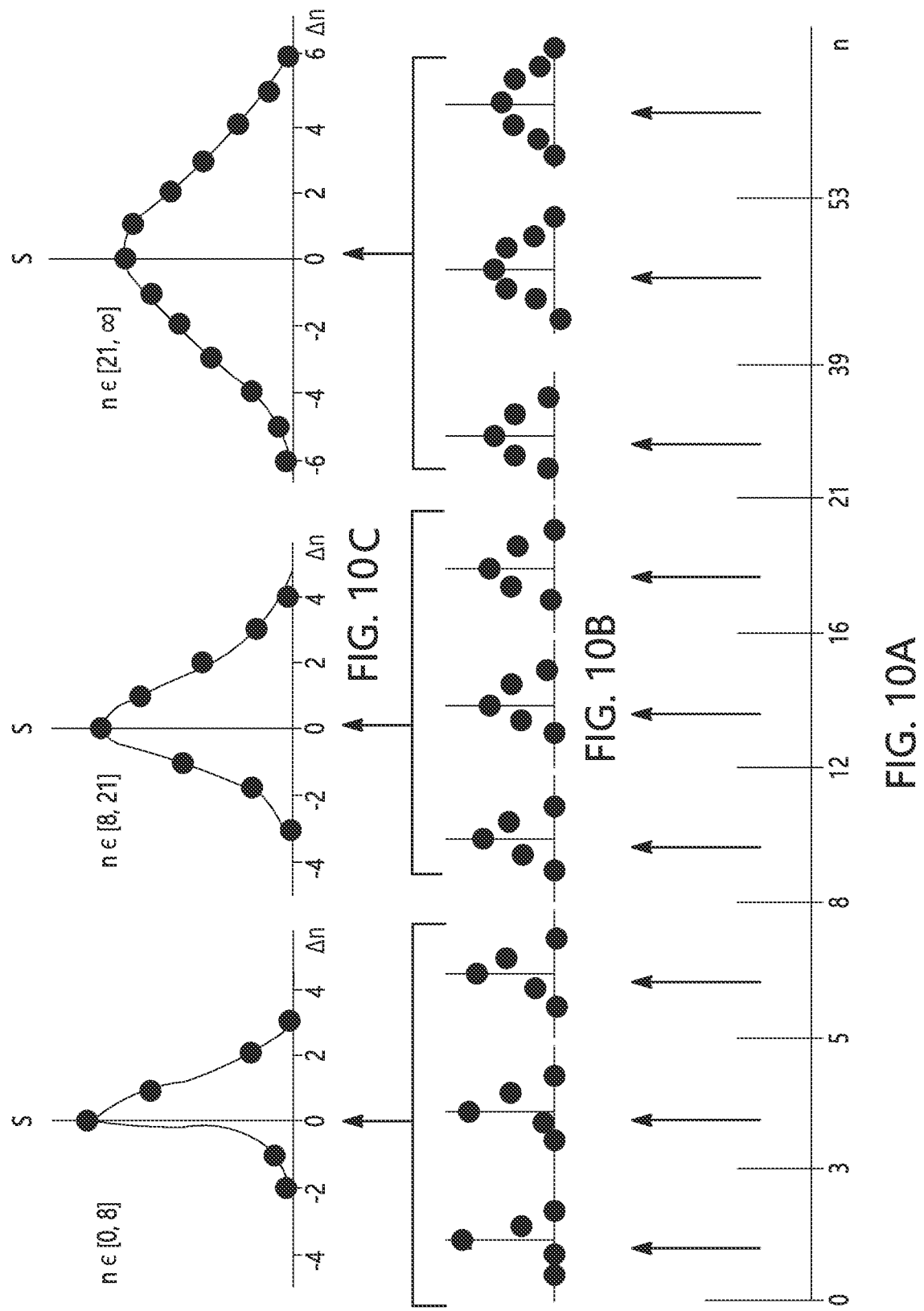

CROWD ANOMALY DETECTION

RELATED APPLICATIONS

This application is a continuation-in-part of U.S. application Ser. No. 18/325,650, filed May 30, 2023, the entire content of which is hereby incorporated by reference.

BACKGROUND

Automated security and monitoring systems typically rely on imaging devices, such as video cameras, with computer vision capabilities for performing object recognition. Objection recognition may be used to detect anomalies in a recorded scene.

BRIEF DESCRIPTION OF THE DRAWINGS

FIG. 10 illustrates a method for rearranging the boundaries of a plurality of histograms, according to some aspects.

Figure 1:
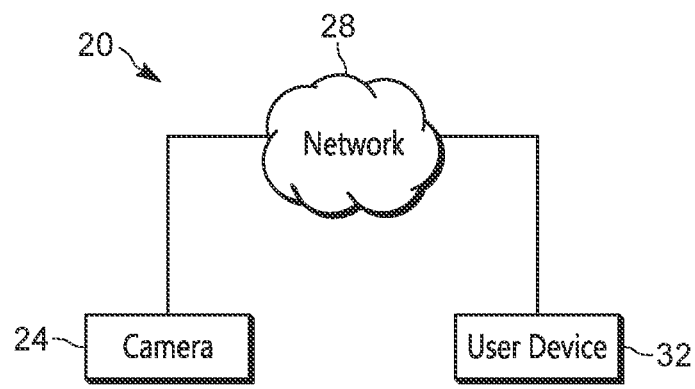
FIG. 1 illustrates a video security system, according to some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

The identification of anomalies in the numbers of objects (e.g., people) in a recorded scene is dependent on the context of that scene. A number of people that is anomalous for one scene, or camera view, may be normal for another camera view. Similarly, the number of people and/or the dynamics in the number of people that is normal in a camera view during a first period of time, such as during daytime, may be anomalous during a second period of time, such as during nighttime. Conventional anomaly detection methods require users to define many specific criteria that strictly define what is considered an anomaly, such as a specific crowd size or a specific crowd growth rate.

Additionally, conventional methods of reporting anomalies based on collected statistics of numbers of people in a recorded scene are unreliable because the data relating to the number of detected people is highly correlated. As an example, a computer may determine that, for a period of two minutes, a group of people detected in a region of interest includes twenty people. In the particular region of interest, twenty people may be an anomalous group size that occurs infrequently (e.g., only once per month). However, if the computer detects the number of people in each frame of the video data, and the video data includes ten frames per second ("fps"), after two minutes the computer will calculate that the anomaly of twenty people actually occurs 1,200 times per month. In such instances, the computer may falsely determine that a group of ten people is not anomalous.

As another example, a computer may determine that a group of people detected in the region of interest includes eleven people, and the average number of people in that region of interest is ten people. Even though it may not be anomalous for eleven people to be in a region of interest where ten people is normal, if the computer has never detected eleven people in that region before, then the computer will determine that detecting eleven people has zero probability of occurring. In such instances, the computer would determine that a group of eleven people is anomalous.

Therefore, there is need for a crowd anomaly detection method that takes into account crowd statistics for a region of interest. One example provides a video security system including an image sensor configured to capture video data, and an electronic processor. The electronic processor is configured to detect an anomaly by: obtaining the video data captured using the image sensor; determining a number of people detected in each of a plurality of frames of the video data; for each moment t, determining an average number of people n over a time interval $(t-\Delta t1, t)$, where $\Delta t1$ is greater than or equal to the moment t; for each non-overlapping time interval $\Delta t1$, updating a histogram based on the average number of people for the time interval $\Delta t1$; and, at each moment t, determining a probability $\rho$ associated with the average number of people n over the time interval $(t-\Delta t1, t)$ using the histogram. In response to determining that the probability $\rho$ of the average number of people n over the time interval $(t-\Delta t1, t)$ is less than a threshold probability $p^*$, the electronic processor generates an alert indicating that an anomalous crowd size is detected.

In some aspects, the electronic processor is further configured to fit the histogram to a decay function.

In some aspects, each moment t is approximately 1 second.

In some aspects, $\Delta t1$ is a user-defined value.

In some aspects, $\Delta t1$ is between approximately 0.3 minutes and approximately 2 minutes.

In some aspects, the electronic processor is configured to provide the alert to a user interface.

In some aspects, the electronic processor is further configured to preprocess the video data by smoothing the number of people detected in each of the plurality of frames of the video data over each moment t.

Another example provides a video security system including an image sensor configured to capture video data, and an electronic processor. The electronic processor is configured to detect an anomaly by: obtaining the video data captured using the image sensor; determining a number of people detected within each of a plurality of frames of the video data; for each moment t, determining an average number of people $n1(t)$ over a time interval $(t-\Delta t1, t)$, where $\Delta t1$ is greater than or equal to the moment t; for each moment t, determining an average number of people $n2(t)$ over a time interval $(t-\Delta t2, t)$, where $\Delta t2$ is greater than or equal to $\Delta t1$; for each moment t, determining a change $\Delta n$ in an average number of people based on at least one selected from the group consisting of the average number of people $n1(t)$ and the average number of people $n2(t)$; for each moment t, selecting one of a plurality of first histograms based on the average number of people $n2(t)$; for each moment t, determining a probability $\rho$ of the change $\Delta n$ in the average number of people based on the selected one of the plurality of first histograms; and determining whether the probability $\rho$ is less than a threshold probability $\rho^*$. In response to determining that the probability $\rho$ is less than a threshold probability $\rho^*$, the electronic processor generates an alert indicating that an anomalous crowd growth is detected.

In some aspects, the electronic processor is further configured to, for each non-overlapping time interval $\Delta t1$, update one of a plurality of second histograms based on the average number of people $n2(t)$ over the time interval $(t-\Delta t2, t)$ and the change $\Delta n$ by: assigning the change $\Delta n$ to one of a plurality of bins based on the average number of people $n2(t)$ over the time interval $(t-\Delta t2, t)$, wherein each of the plurality of bins is associated with a non-overlapping range of values of the average number of people $n2(t)$ over a plurality of time intervals $\Delta t2$; updating an equi-depth histogram with the average number of people $n2(t)$ over the time interval $(t-\Delta t2, t)$, where the equi-depth histogram includes the plurality of bins; selecting one of the plurality of second histograms based on the assigned one of the plurality of bins, wherein each of the plurality of second histograms is associated with one of the plurality of bins; and updating the selected one of the plurality of second histograms with the change $\Delta n$ in the average number of people, wherein each of the plurality of first histograms is an aggregation second histograms included in one of a plurality of non-overlapping clusters of second histograms. Histograms included in the plurality of second histograms are a different type of histogram than histograms included in the plurality of first histograms.

In some aspects, the electronic processor is further configured to, for each non-overlapping time interval $\Delta t3$ where $\Delta t3$ is greater than or equal to $\Delta t1$, rearrange boundaries of the plurality of first histograms by: updating the equi-depth histogram by modifying the non-overlapping ranges of values of the average number of people $n2(t)$ associated with the plurality of bins such that each bin includes an equal amount of data; updating the plurality of second histograms according to modifications to the non-overlapping ranges of values of the average number of people $n2(t)$ associated with the plurality of bins such that each of the plurality of second histograms is associated with one of the plurality of bins; updating the plurality of non-overlapping clusters of second histograms based on changes to the plurality of second histograms; and updating the plurality of first histograms based on changes to the plurality of non-overlapping clusters of second histograms.

In some aspects, each of the plurality of second histograms is included in one of the plurality of non-overlapping clusters of second histograms.

In some aspects, each of the plurality of first histograms is a sum of second histograms included in one of a plurality of non-overlapping clusters of second histograms.

In some aspects, a number of the plurality of second histograms is predetermined.

In some aspects, the electronic processor is configured to, for each moment t, determine the change $\Delta n$ in an average number of people by subtracting the average number of people $n2(t)$ over the time interval $(t-\Delta t2, t)$ from the average number of people $n1(t)$ over the time interval $(t-\Delta t1, t)$.

In some aspects, the electronic processor is configured to, for each moment t, determine the change $\Delta n$ in an average number of people by subtracting the average number of people $n1(t-\Delta t1)$ calculated over a prior time interval $\Delta t1$ from the average number of people $n1(t)$ calculated over a more recent time interval $\Delta t1$.

In some aspects, the electronic processor is further configured to extrapolate the selected one of the plurality of first histograms by fitting a Skellam probability distribution to the selected one of the plurality of first histograms.

In some aspects, the electronic processor is configured to provide the alert to a user interface.

In some aspects, $\Delta t2$ is a user-defined value.

In some aspects, $\Delta t1$ is between approximately 0.3 minutes and approximately 2 minutes.

Another example provides a method for detecting an anomaly in a region of interest of a camera. The method includes capturing video data using an image sensor; and detecting an anomaly by: obtaining the video data captured using the image sensor; determining a number of people detected within each of a plurality of frames of the video data; for each moment t, determining an average number of people $n1(t)$ over a time interval $(t-\Delta t1, t)$, where $\Delta t1$ is greater than or equal to the moment t; for each moment t, determining an average number of people $n2(t)$ over a time interval $(t-\Delta t2, t)$, where $\Delta t2$ is greater than or equal to $\Delta t1$; for each moment t, determining a change $\Delta n$ in an average number of people based on at least one selected from the group consisting of the average number of people $n1(t)$ and the average number of people $n2(t)$; for each moment t, selecting one of a plurality of first histograms based on the average number of people $n2(t)$; for each moment t, determining a probability $\rho$ of the change $\Delta n$ in the average number of people based on the selected one of the plurality of first histograms; determining whether the probability $\rho$ is less than a threshold probability $\rho^*$; and in response to determining that the probability $\rho$ is less than a threshold probability $\rho^*$, generating an alert indicating that an anomalous crowd growth is detected.

Another example provides a method for detecting an anomaly in a region of interest of a camera. The method includes capturing video data using an image sensor; and detecting an anomaly by: obtaining the video data captured using the image sensor; determining a number of people detected within each of a plurality of frames of the video data; for each moment t, determining an average number of people n1(t) over a time interval (t−Δt1, t), where Δt1 is greater than or equal to the moment t; for each moment t, determining an average number of people n2(t) over a time interval (t−Δt2, t), where Δt2 is greater than or equal to Δt1; for each moment t, determining a change Δn in an average number of people based on at least one selected from the group consisting of the average number of people n1(t) and the average number of people n2(t); for each moment t, selecting one of a plurality of first histograms based on the average number of people n2(t); for each moment t, determining a probability ρ of the change Δn in the average number of people based on the selected one of the plurality of first histograms; determining a frequency f of the change Δn in the average number of people based on the probability ρ; determining whether the frequency f is less than or equal to a threshold frequency f_th; in response to determining that the frequency f is less than or equal to a threshold frequency f_th, generating an alert indicating that an anomalous crowd size change is detected.

In some aspects, the threshold frequency f_th is a user-selected frequency threshold.

In some aspects, when Δn is positive, the frequency f is defined as f=(1−F(Δn))T/Δt1, when Δn is negative, the frequency f is defined as f=(F(Δn))T/Δt1, where F(Δn) is a cumulative distribution function corresponding to a probability density distribution function obtained from the selected one of the plurality of first histograms evaluated at Δn, and T is a time interval defining a measurement unit for the frequency f.

Another example provides a video security system including an image sensor configured to capture video data; and an electronic processor configured to detect an anomaly by: obtaining the video data captured using the image sensor; determining a number of people detected in each of a plurality of frames of the video data; for each moment t, determining an average number of people n over a time interval (t−Δt1, t), where Δt1 is greater than or equal to the moment t; for each non-overlapping time interval Δt1, updating a histogram based on the average number of people for the time interval Δt1; at each moment t, determining a probability ρ associated with the average number of people n over the time interval (t−Δt1, t) using the histogram; and determining a frequency f of the average number of people n based on the probability ρ; determining whether the frequency f is less than or equal to a threshold frequency f_th; in response to determining that the frequency f is less than or equal to a threshold frequency f_th, generating an alert indicating that an anomalous crowd size is detected.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

FIG. 1 illustrates a video security system 20, according to some examples. The system 20 at least includes an imaging device, or camera 24, described in greater detail below with respect to FIG. 2. The camera 24 is, for example, a video camera arranged to record a region of interest. The camera 24 may be connectable over a network 28 to one or more devices, such as, for example, a user device 32. The network 28 may include a wide area network, such as the Internet, a local area network, or the like, employing any of a variety of communications protocols, such as Wi-Fi, Bluetooth®, ZigBee, and the like. Alternatively or in addition, the camera 24 and/or the user device 32 may connect to the network 28 via a wired connection (e.g., using a cable, such as an Ethernet cable).

The user device 32 may be any suitable device for receiving a communication from the camera 24. For example, the user device 32 may be a mobile computing device (e.g., a cell phone, a smart phone, a tablet computer, a laptop computer, a personal digital assistant (PDA), etc.), a desktop computing device, a server computing device, or other networked computing device.

Figure 2:
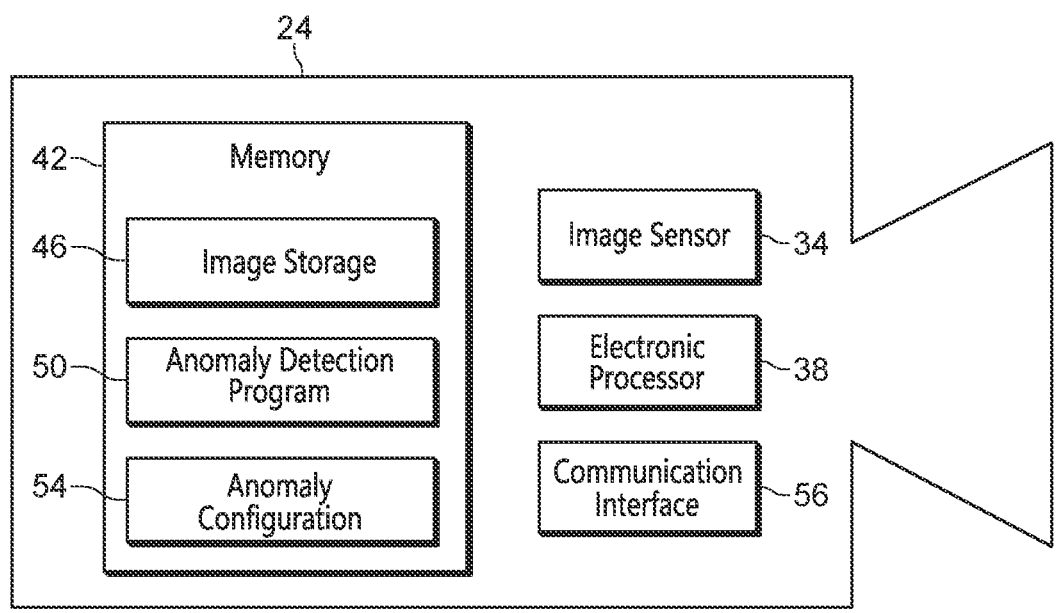
FIG. 2 illustrates an imaging device, according to some aspects.

FIG. 2 schematically illustrates the camera 24, according to some examples. The camera 24 includes an image sensor 34 for capturing video data. The camera 24 may be a digital imaging device or an analog imaging device. The image sensor 34 may be configured to capture light within the visible light frequency range and/or outside of the visible light frequency range (e.g., infrared or ultraviolet light). In some instances, the image sensor 34 includes multiple image sensors 34 configured to capture light in different frequency ranges. In some instances, the camera 24 is a stereo camera including at least two image sensors 34.

The camera 24 also includes an electronic processor 38 (for example, a microprocessor or other electronic device). The electronic processor 38 is electrically or communicatively coupled to the image sensor 34, a memory 42, and a communication interface 56. The electronic processor 38 includes suitable processing circuitry for performing the methods described herein or any combination of suitable processing circuitry. For example, the electronic processor 38 may include a digital signal processor (DSP), a graphics processing unit (GPU) embedded processor, a vision processing unit, etc. One or more circuit units included in the electronic processor 38 may operate independently or in parallel with one another.

In the example shown, the memory 42 stores data and computer program instructions for performing, among other things, the methods described herein. For example, the memory 42 includes image storage 46 for storing images captured by the image sensor 34, an anomaly detection program 50 executable by the electronic processor 38 for identifying anomalies in a region of interest recorded by the camera 24, and an anomaly detection configuration 54. The anomaly detection configuration 54 includes, for example, a user-defined frequency of anomaly detection. For example, using the user device 32, a user may set the anomaly detection configuration 54 of the camera 24 such that an anomaly is defined as an event that occurs no more than once a week, once a month, once a year, or the like. The memory 42 may include read only memory (ROM), random access memory (RAM), other non-transitory computer-readable media, or a combination thereof.

The camera 24 (e.g., the electronic processor 38) is configured to send and receive data, such as video data, video analytics data, alerts, and/or commands to one or more external devices (e.g., the user device 32) using the communication interface 56. In some instances, the anomaly detection program 50 and the anomaly detection configuration 54 are stored external to the camera 24, and the camera 24 transmits video data to an external device for anomaly detection. Accordingly, although methods relating to the anomaly detection program 50 are described herein with respect to the components of the camera 24, it should be understood that such methods may be performed using components external to the camera 24. The camera 24 may include additional components other than those described with respect to FIG. 2.

Figure 3:
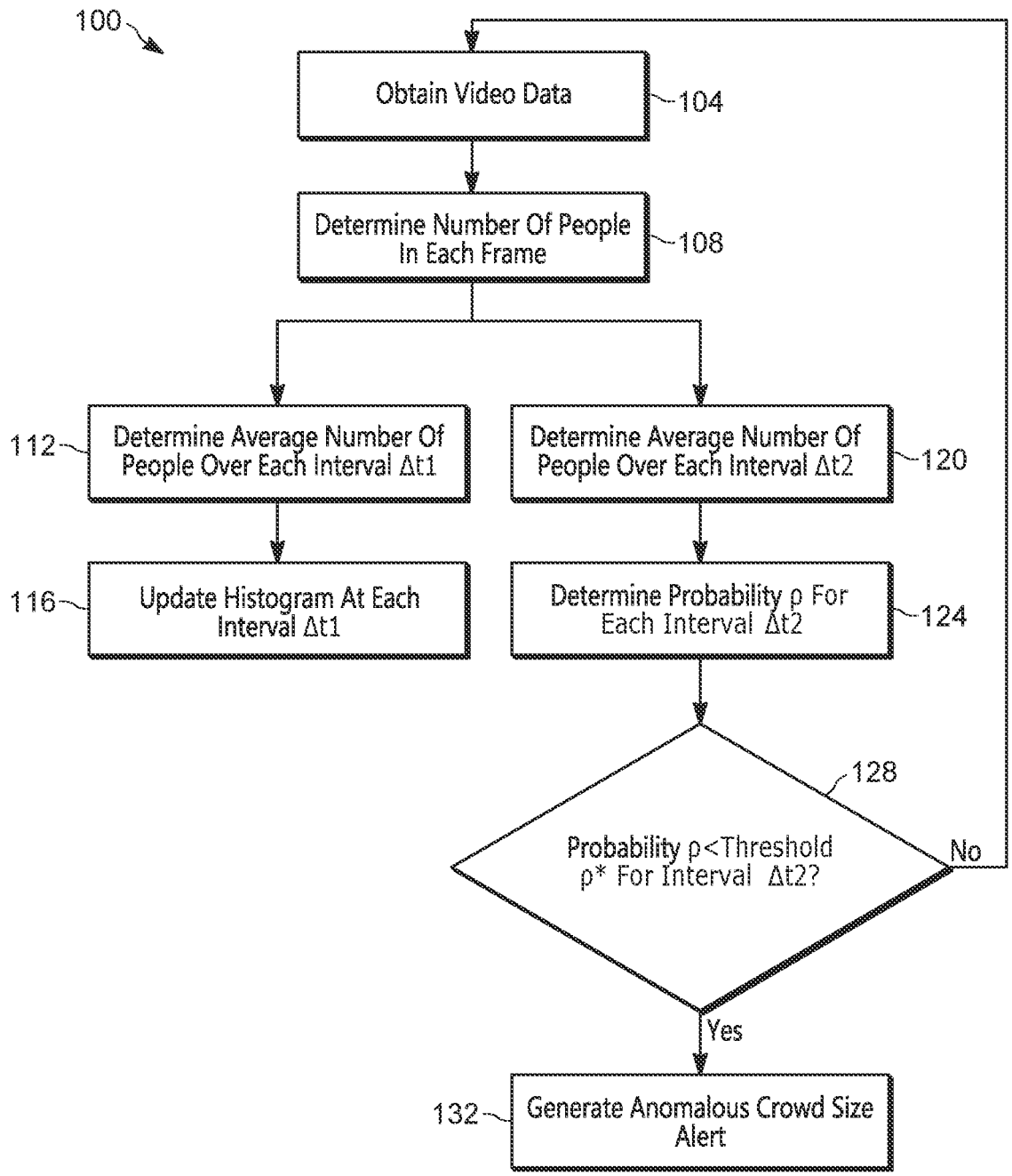
FIG. 3 illustrates a method for detecting an anomaly in video data, according to some aspects.

FIG. 3 illustrates a method 100 performed, for example, by the electronic processor 38 for detecting an anomaly, such as a crowd size anomaly. The method 100 includes obtaining video data (e.g., a plurality of image frames) captured using the image sensor 34 (at block 104). The video data includes a plurality of frames, and the electronic processor 38 determines a number of specific objects, such as people, detected in each of the plurality of frames (at block 108). The electronic processor 38 detects the number of people in each frame using known computer vision and object detection techniques.

In some instances, the electronic processor 38 preprocesses the number of people detected in each of the plurality of frames to reduce noise in the detection of the number of people in each frame (at block 112). For example, the electronic processor 38 may smooth the number of people detected in each frame over each moment t. Each moment of time t may be a period of time including a predetermined number of frames (e.g., five frames, ten frames, etc.) In some instances, each moment t is approximately one second. The electronic processor 38 smooths the number of people detected in each frame over each moment t by, for example, determining a median number of people detected in each frame over the moment t. However, the electronic processor 38 may smooth the number of people detected in each frame over each moment t using other methods, such as, for example, averaging the number of people detected in each frame over the moment t.

Figure 4:
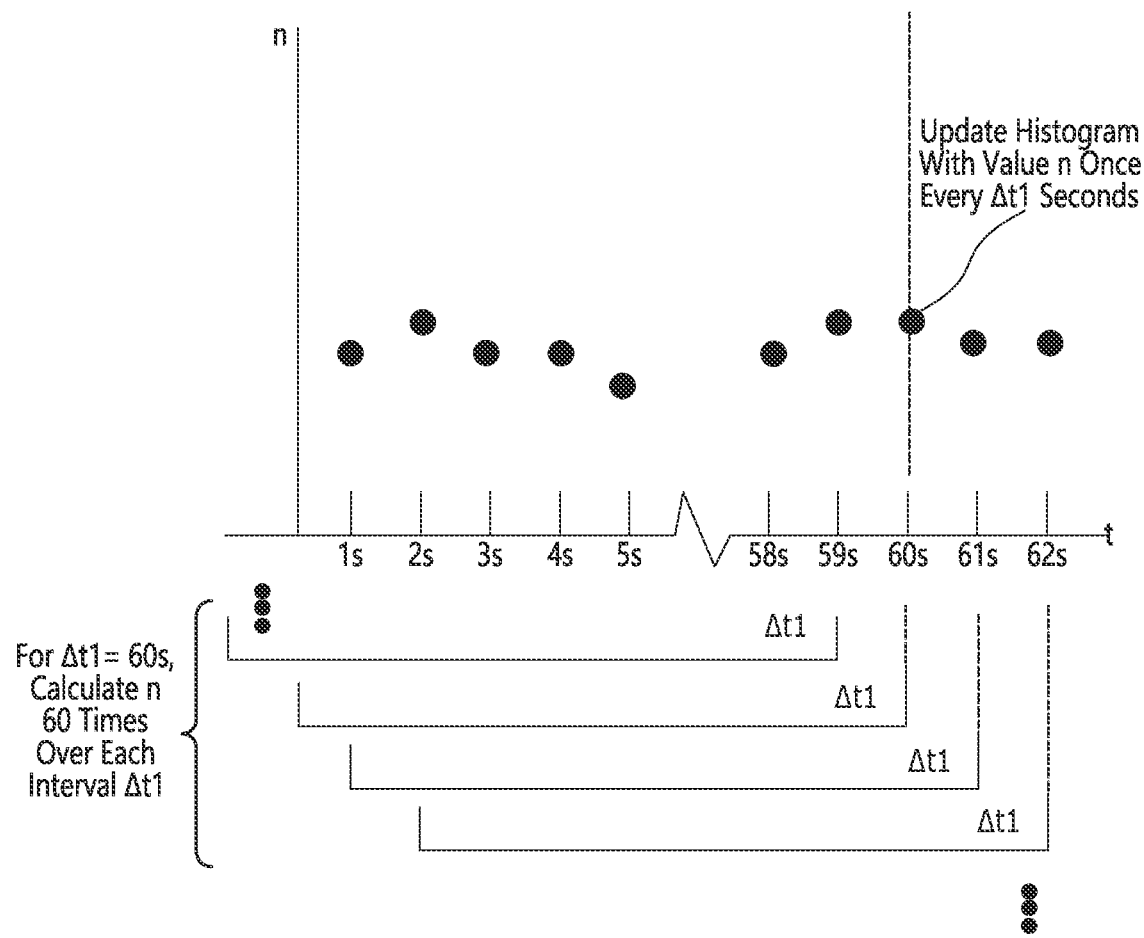
FIG. 4 illustrates example calculations of average number of people over time intervals $\Delta t1$.

As described above, reporting anomalies only based on the probability distribution of the number of people detected in each frame of video data results in significant data correlation. Therefore, the electronic processor 38 performs block averaging to decorrelate the data related to the number of people detected in the video data. The electronic processor 38 determines, for each of a plurality of overlapping time intervals $\Delta t1$ within the plurality of frames, an average number of detected people over the time interval $\Delta t1$ (at block 116). The time interval $\Delta t1$ may be a user-defined value included in the anomaly detection configuration 54. The time interval $\Delta t1$ may be, for example, a value between approximately 0.3 minutes and approximately 2 minutes. However, other values for the time interval $\Delta t1$ are contemplated. The time interval $\Delta t1$ may otherwise be referred to as a decorrelation time interval $\Delta t1$. For example, as illustrated in FIG. 4, for each moment t (e.g., one second), the electronic processor 38 determines the average number of people n over the time interval (t−$\Delta t1$, t), where $\Delta t1$ is, for example, 60 seconds. The example illustrated in FIG. 4 includes a moment t of one second and a time interval $\Delta t1$ of sixty seconds, however, other values of t and $\Delta t1$ are contemplated. For example, in some instances, the moment t occurs every frame (e.g., at 10 fps, the moment t occurs every 0.1 seconds).

Referring again to FIG. 3, after each non-overlapping time interval $\Delta t1$, the electronic processor 38 updates a histogram (e.g., a histogram stored in the memory 42) based on the average number of detected people for that time interval $\Delta t1$ (at block 120). As used herein, the term "histogram" refers to any probability distribution for describing the probability of different possible values of a variable, such as the number of detected people in video data. For example, the electronic processor 38 may store probability data associated with the average number of detected people in the form of a data table. Although the electronic processor 38 determines the average number of people n over a time interval $\Delta t1$ at each moment t, the electronic processor 38 only updates the histogram one time during each respective time interval $\Delta t1$. Referring again to FIG. 4 as an example where a moment t is one second and the time interval $\Delta t1$ is sixty seconds, the electronic processor 38 determines the average number of people n sixty times over each sixty second time interval $\Delta t1$. Once per every non-overlapping interval $\Delta t1$ (e.g., after every sixty seconds), the electronic processor 38 updates the histogram using the average number of detected people n calculated with respect to the moment t for that time interval (t−$\Delta t1$, t). By updating the histogram only once for each non-overlapping interval of $\Delta t1$ rather than every moment t, the electronic processor 38 is able to decorrelate the values of average number of detected people n that are calculated every moment t.

Figure 5A:
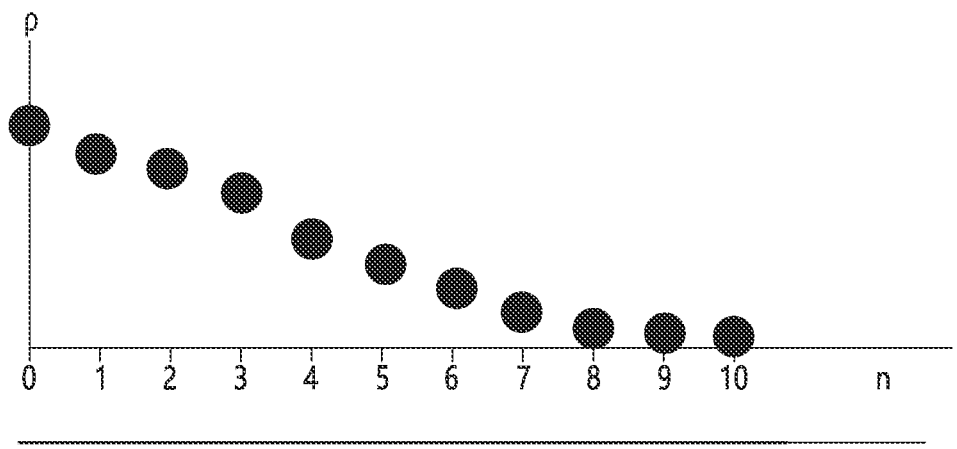
FIG. 5A illustrates a histogram, according to some aspects.

FIG. 5A illustrates an example histogram where n represents the number of detected people decorrelated by averaging over the time interval $\Delta t1$, and ρ represents the probability, or frequency, of different values of n. In the illustrated example, zero is the most frequently recorded average number of detected people, while ten is the least frequently recorded average number of detected people. Values of n and ρ in the histogram may vary depending on implementation, such as for example, based on location of the camera 24.

Figure 5B:
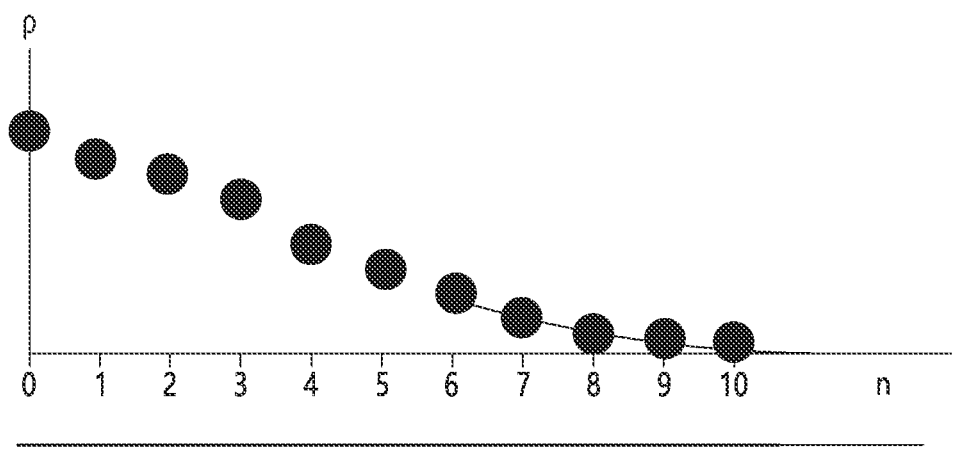
FIG. 5B illustrates a histogram with a tail portion fitted to a decay function, according to some aspects.

As described above, if the electronic processor 38 has never detected, for example, eleven people in the region of interest before, then, using only the data recorded in the histogram, the electronic processor 38 would determine that detecting eleven people has zero probability of occurring. The determination that detecting eleven people has zero probability would be caused by the limited amount of video data processed by the electronic processor 38 by that point in time. Therefore, as illustrated in FIG. 5B, in some embodiments, the electronic processor 38 fits at least a portion of the histogram to a decay function, using, for example, a Poisson distribution, an exponential decay function, or the like. For example, the electronic processor 38 fits the tail portion of the histogram (e.g., data points of the histogram below a certain probability ρ) to the decay function. However, in some instances, the electronic processor 38 fits the entire histogram to the decay function. By fitting the histogram to a decay function, the electronic processor 38 is able to determine non-zero probabilities p associated with values of n that have not yet been recorded in the histogram.

Referring again to FIG. 3, for each moment t, the electronic processor 38 determines, using the histogram, the probability ρ associated with the average number of detected people n over the time interval (t−$\Delta t1$, t) (at block 124). Although the electronic processor 38 only updates the histogram (for example, at block 116) once every non-overlapping time interval $\Delta t1$ (e.g., intervals of 1-60 seconds, 61-120 seconds, 121-180 seconds, etc.), the electronic processor 38 determines (for example, at block 124) the probability ρ of the value n at every moment t (e.g., every second). In other words, at block 124, the electronic processor 38 references the histogram for each moment t of overlapping time intervals $\Delta t1$ (e.g., 1-61 seconds, 2-62 seconds, 3-63 seconds, etc.) and determines a value of probability ρ at each moment t.

The electronic processor 38 compares the determined probability ρ with a threshold probability ρ*, and determines whether the probability ρ is less than the threshold probability ρ* (at block 128). The threshold probability ρ* may be a user-defined probability threshold included, for example, in the anomaly detection configuration 54. The threshold probability ρ* indicates a frequency of an anomaly occurrence (e.g., a crowd size anomaly occurrence) for the region of interest recorded by the camera 24. For example, a user may select a frequency of anomaly occurrence of no more than once per week, once per month, or another period of time. For example, when the electronic processor 38 determines, using the histogram, that the average number of detected people n corresponds to a value n in the histogram having a sufficiently low probability ρ of occurring (e.g., below the threshold probability ρ*), the electronic processor 38 determines that a crowd size anomaly has occurred.

In response to detecting an anomalous crowd size (YES at block 128), the electronic processor 38 generates an alert indicating that a crowd size anomaly has occurred (at block 132). The electronic processor 38 provides the alert to, for example, the user device 32 over the network 28 and continues performing the anomaly detection method 100 by, for example, repeating the steps of the method 100. When an anomalous crowd size is not detected (NO at block 128), the electronic processor 38 continues the anomaly detection method 100 by, for example, repeating the steps of the method 100.

In some instances, as an alternative to or in addition to detecting a crowd size anomaly, the electronic processor 38 is configured to detect, using histogram data, a crowd growth anomaly. FIG. 5 illustrates a method 200 performed, for example, by the electronic processor 38 for generating and updating a histogram used in detecting a crowd growth anomaly.

The method 200 includes obtaining video data captured using the image sensor 34 (at block 204). The video data includes a plurality of frames, and the electronic processor 38 determines a number of specific objects, such as people, detected in each of the plurality of frames (at block 208). The electronic processor 38 detects the number of people in each frame using known computer vision and object detection techniques.

In some instances, the electronic processor 38 preprocesses the number of people detected in each of the plurality of frames to reduce noise in the detection of the number of people in each frame (at block 212). For example, the electronic processor 38 may smooth the number of people detected in each frame over each moment t. Each moment of time t may be a period of time including a predetermined number of frames (e.g., five frames, ten frames, etc.) In some instances, each moment t is incremented by approximately one second. The electronic processor 38 smooths the number of people detected in each frame over each moment t by, for example, determining a median number of people detected in each frame over the moment t. However, the electronic processor 38 may smooth the number of people detected in each frame over each moment t using other methods, such as, for example, averaging or removing outliers in the number of people detected in each frame over the moment t.

For each moment t, the electronic processor 38 determines an average number of people $n1(t)$ over a time interval $(t-\Delta t1, t)$ (at block 216) within the plurality of frames. In some embodiments, the time interval $\Delta t1$ is a user-defined value included in the anomaly detection configuration 54 of the camera 24. The time interval $\Delta t1$ may be, for example, a value between approximately 0.3 minutes and approximately 2 minutes. However, other values for the time interval $\Delta t1$ are contemplated.

The electronic processor 38 additionally determines, for each moment t, an average number of people $n2(t)$ over a time interval $(t-\Delta t2, t)$ (at block 220) within the plurality of frames. For a given moment t, the time interval $\Delta t2$ begins prior to the most recent time interval $\Delta t1$, and the time interval $\Delta t2$ is greater than the time interval $\Delta t1$. For example, the time interval $\Delta t2$ may be approximately 10 minutes, approximately 30 minutes, approximately 60 minutes, or the like. In some instances, the time interval $\Delta t2$ is a user-defined time interval included as part of the anomaly detection configuration 54.

For each moment t, the electronic processor 38 determines a change $\Delta n$ in the number of people based on the average number of people $n1(t)$ over the time interval $(t-\Delta t1, t)$ and/or the average number of people $n2(t)$ over the time interval $(t-\Delta t2, t)$ (at block 224). In some instances, the electronic processor 38 determines the change $\Delta n$ for each moment t by subtracting the average number of people $n2(t)$ over the time interval $(t-\Delta t2, t)$ from the average number of people $n1(t)$ over the time interval $(t-\Delta t1, t)$. As described above, the time interval $\Delta t2$ may be longer than the time interval $\Delta t1$. Therefore, in other words, at a moment in time t, the electronic processor 38 may determine the change $\Delta n$ in the number of people by subtracting the average number of people over the longer period of time from the average number of people detected at that moment t. For example, when, at a moment t, the electronic processor 38 determines that the average number of people $n2(t)$ over the time interval $(t-\Delta t2, t)$ is 10 people, and the average number of people $n1(t)$ over the time interval $(t-\Delta t1, t)$ is 8 people, then the electronic processor 38 determines that the change $\Delta n$ in the number of people is minus 2 (−2) people.

However, in some instances, the electronic processor 38 determines the change $\Delta n$ for each moment t by subtracting the average number of people $n1(t-\Delta t1)$ calculated over a prior time interval $\Delta t1$ from the average number of people $n1(t)$ calculated over a more recent time interval $\Delta t1$. For example, when the electronic processor 38 determines that the average number of people $n1(t-\Delta t1)$, calculated over the time interval $(t-(2*\Delta t1))$, $t-\Delta t1)$, is 10 people, and the average number of people $n1(t)$, calculated over the time interval $(t-\Delta t1, t)$, is 8 people, then the electronic processor 38 determines that the change $\Delta n$ in the number of people is minus 2 (−2) people.

Figure 7:
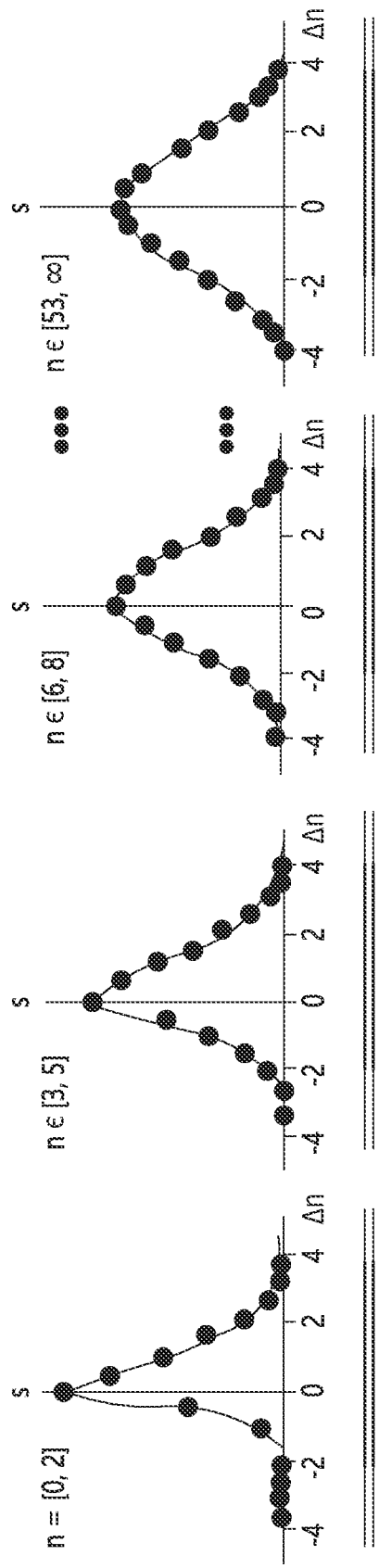
FIG. 7 illustrates a plurality of aggregated histograms, according to some aspects.

Anomaly analysis for the change $\Delta n$ in the number of people varies depending on the average number of people $n2(t)$ detected for that moment t over the time interval $\Delta t2$. For example, a change $\Delta n$ of six people over a time interval $\Delta t2$ (e.g., thirty minutes) may be an anomaly if the average number of detected people $n2(t)$ over the time interval $\Delta t2$ is zero, but may not be an anomaly if the average number of detected people $n2(t)$ over that same time interval $\Delta t2$ is one hundred people. Therefore, the electronic processor 38 generates a plurality of aggregated histograms based on the change $\Delta n$ in the number of people rather than a single histogram, and, once per non-overlapping time interval $\Delta t1$, updates one of the plurality of aggregated histograms with the change $\Delta n$ (at block 228). FIG. 7 illustrates one example of the plurality of aggregated histograms. Each of the plurality of aggregated histograms is associated with a range of average number of detected people $n2(t)$. The electronic processor 38 determines ranges of values for the average number of detected people $n2(t)$ over each time interval $\Delta t2$ and generates an aggregated histogram for each range. In the example illustrated in FIG. 7, the electronic processor 38 determines ranges of values of average number of detected people $n2(t)$ over intervals of $\Delta t2$ for $n2 \in [0, 2]$, $n2 \in [3, 5]$, $n2 \in [6, 8]$, . . . , $n2 \in [53, \infty]$. However, electronic processor 38 may determine different ranges depending on the determined values for average number of detected people $n2(t)$.

For a respective range of n2, the corresponding histogram describes changes $\Delta n$ in the number of people and the probability ρ corresponding to each change Δn. To account for values of change Δn that may not have been recorded in the respective histogram before, the electronic processor 38 may approximate the probability distribution of each histogram using, for example a Skellam distribution. For example, the electronic processor 38 may approximate the probability distribution according to the equation:

$$\rho(\Delta n) = e^{-(\mu_1+\mu_2)}\left(\frac{\mu_1}{\mu_2}\right)^{\frac{\Delta n}{2}} I_{\Delta n}(2\sqrt{\mu_1\mu_2})$$

where $\mu_1$ and $\mu_2$ are parameters of the distribution, and $I_{\Delta n}(2\sqrt{\mu_1\mu_2})$ denotes the modified Bessel function of the first kind. However, other methods of approximating the probability distribution of the histograms are contemplated.

Figure 8:
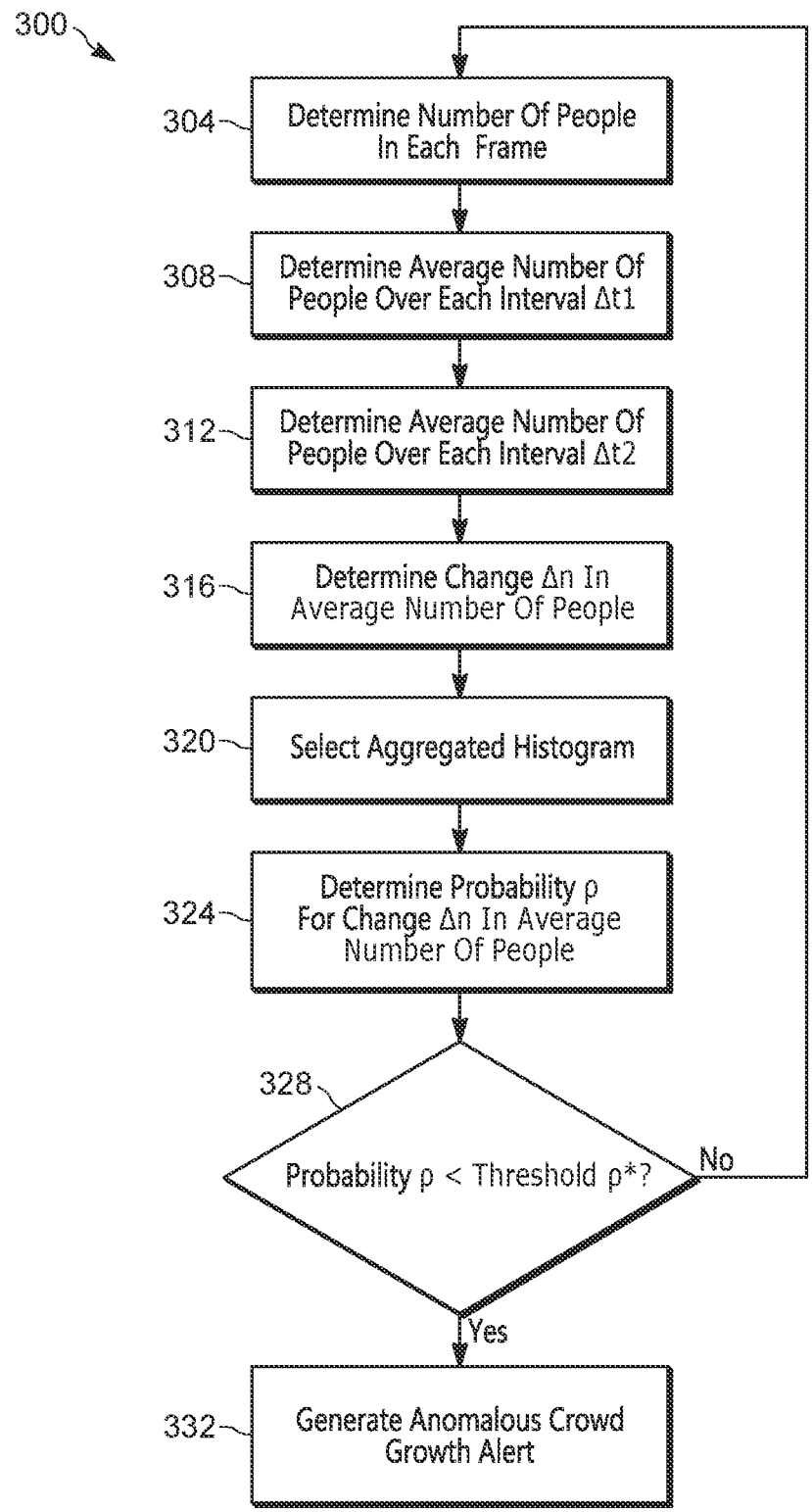
FIG. 8 illustrates a method for updating a histogram, according to some aspects.

FIG. 8 illustrates a method 300 performed, for example, by the electronic processor 38, for updating one of the plurality of aggregated histograms with the change Δn in the average number of people for a time interval Δt1. The method 300 includes updating an equi-depth histogram generated by the electronic processor 38, such as the equi-depth histogram illustrated in FIG. 9A, using the average number of people n2(t) (at block 304). The equi-depth histogram includes plurality of bins where each bin corresponds to a range of values of the average number of people n2(t) over time intervals Δt2, such that each bin includes an equal amount of data. The electronic processor 38 assigns the change Δn to a bin based on the average number of people n2(t) detected for the time interval Δt2 corresponding to the respective change Δn. For example, FIG. 9A illustrates an instance where the electronic processor 38 has recorded the same number of changes Δn corresponding to n2 ∈ [0, 3] as the number of changes Δn corresponding to n2=[21, 39].

Figure 9:
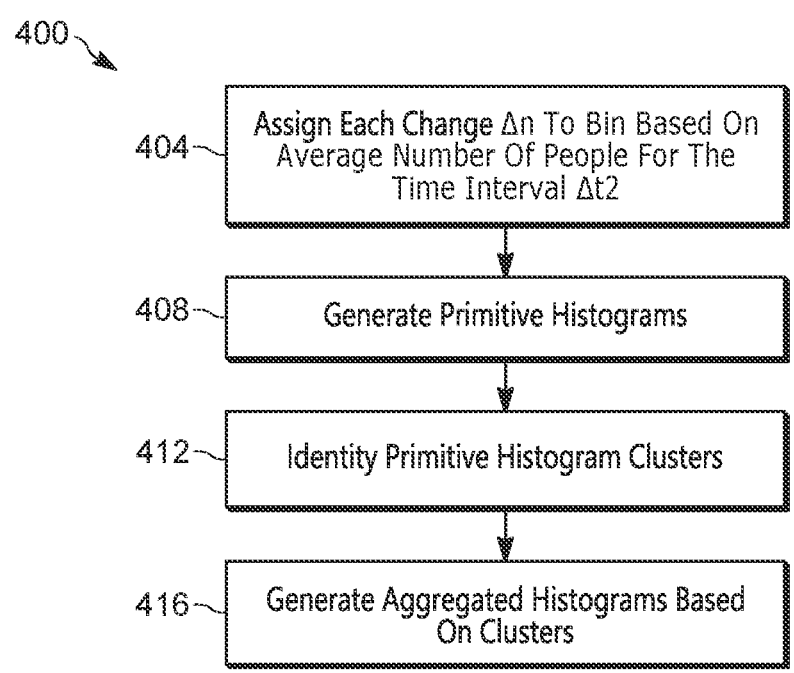
FIG. 9A illustrates an equi-depth histogram, according to some aspects.
FIG. 9B illustrates a plurality of primitive histograms, according to some aspects.
FIG. 9C illustrates a plurality of aggregated histograms, according to some aspects.

Each bin of the equi-depth histogram corresponds to one of a plurality of primitive histograms generated by the electronic processor 38, such as the plurality of primitive histograms illustrated in FIG. 9B. For the respective range of values of n2(t) for its corresponding bin of the equi-depth histogram, each primitive histogram reflects the probability ρ of a change Δn in average number of people. For example, the electronic processor 38 uses the data assigned to the bin for n2∈ [0, 3] to generate a primitive histogram describing the probability associated with changes Δn for values of average number of detected people n2 where n2∈ [0, 3]. The number of primitive histograms generated, and, similarly, the number of bins generated in the equi-depth histogram, may be predetermined.

As illustrated in FIG. 9C, the plurality of primitive histograms is used by the electronic processor 38 to generate the plurality of aggregated histograms. For example, each aggregated histogram corresponds to a non-overlapping cluster of primitive histograms (the clusters described in greater detail below with respect to FIG. 10). The primitive histograms included in each cluster are, for example, summed together to generate the respective aggregated histogram.

After updating the equi-depth histogram (at block 304), the electronic processor 38 identifies and selects one of the plurality of primitive histograms corresponding to the average number of people n2(t) for the change Δn (at block 308). The electronic processor 38 then updates the selected one of the plurality of primitive histograms with the change Δn, which, in turn, causes an update to the aggregated histogram for which the selected primitive histogram is included in a cluster (at block 312). In other words, the electronic processor 38 adds a calculated change Δn to the appropriate primitive histogram (one histogram) based on the number of detected people associated with the change Δn to build aggregated histograms that take into account not just changes in the number of detected people but also an initial number of people.

Figure 6:
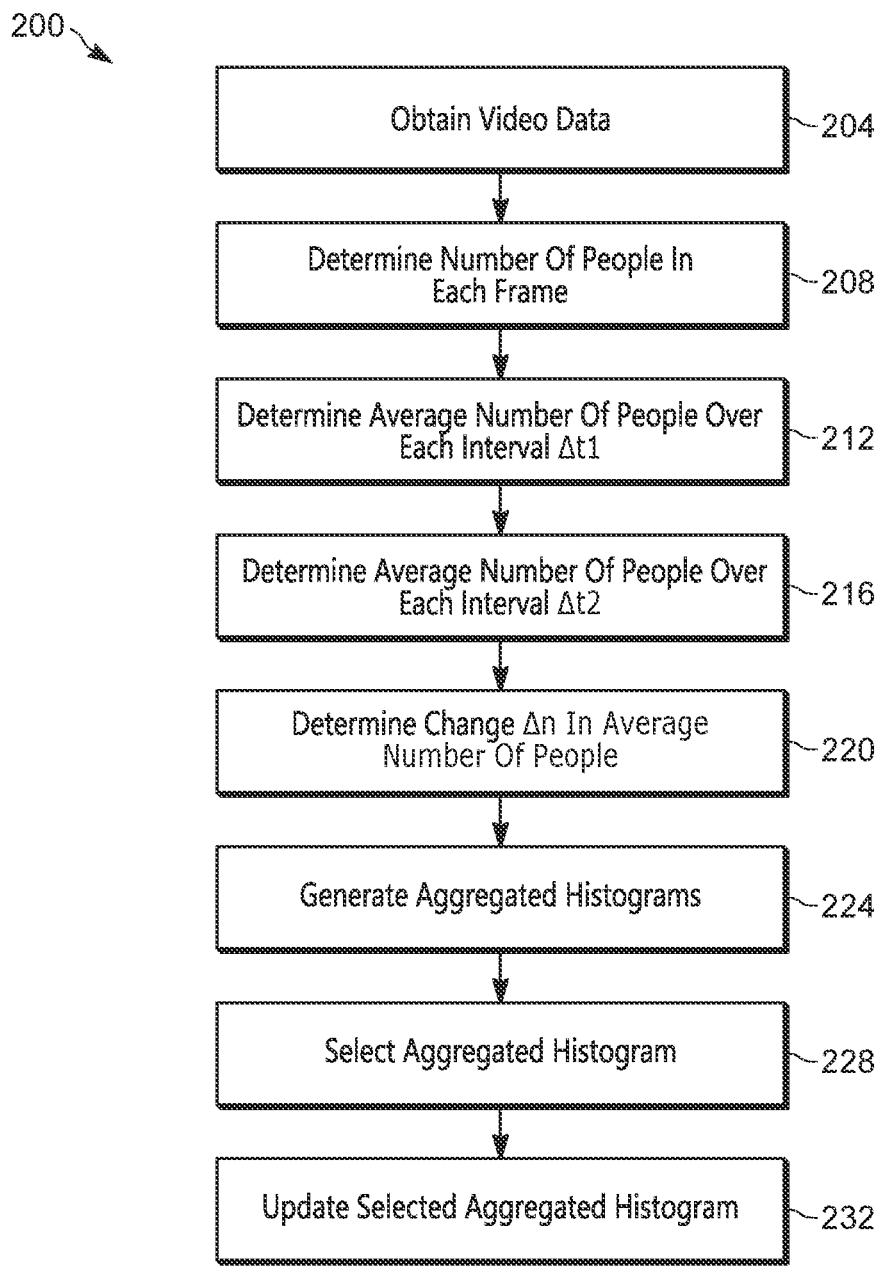
FIG. 6 illustrates a method for detecting an anomaly in video data, according to some aspects.

As described above with respect to FIG. 6, the electronic processor 38 calculates the change Δn for each moment t but only updates the histogram once for each non-overlapping time interval Δt1 in order to, for example, decorrelate the data.

Referring again to FIG. 6, once for each non-overlapping time interval Δt3, the electronic processor 38 rearranges the generated histograms (e.g., the equi-depth histogram, the plurality of primitive histograms, and/or the plurality of aggregate histograms illustrated) (at block 232). The time interval Δt3 is greater than or equal to the time interval Δt1. For example, in some instances, the time interval Δt3 is equal to the time interval Δt1 (e.g., one minute, two minutes, etc.). However, in some instances, the time interval Δt3 is greater than the time interval Δt1 (e.g., five minutes, ten minutes, etc.).

Figure 11A:
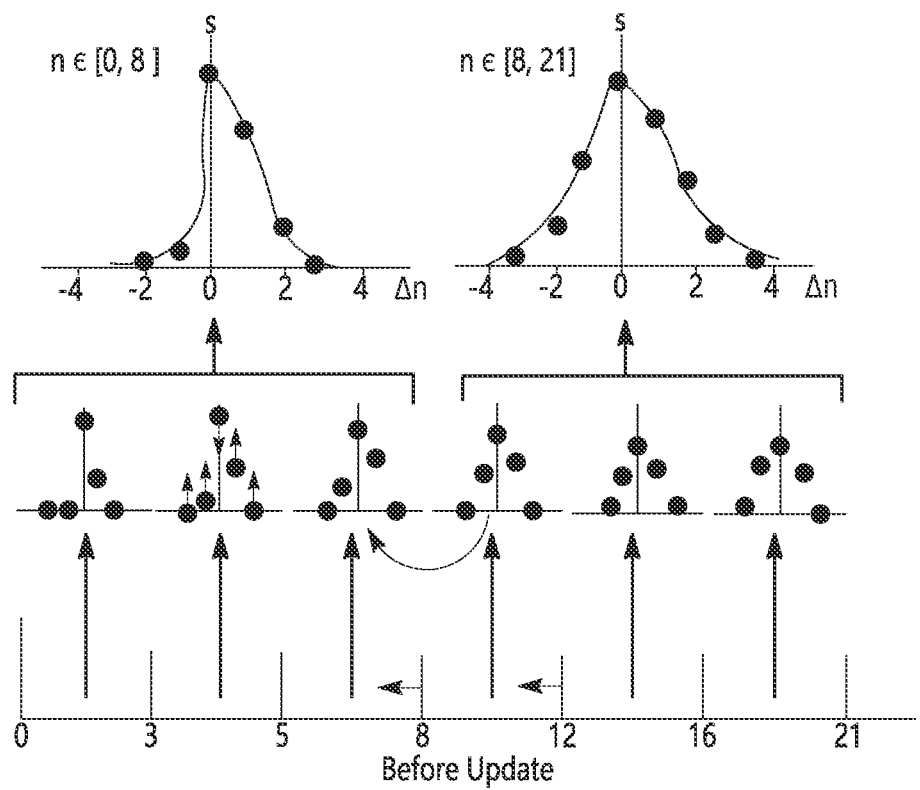
FIG. 11A illustrates a set of histograms generated at a first period of time, according to some aspects.

FIG. 10 illustrates a method 400 performed, for example, by the electronic processor 38, for rearranging the histograms. The method 400 includes updating the bin boundaries of the equi-depth histogram (at block 404). For example, FIGS. 11A and 11B respectively illustrate a set of histograms (e.g., the equi-depth histogram, the plurality of primitive histograms, and the plurality of aggregate histograms) before and after a rearrangement of the histograms, respectively. As illustrated in FIG. 11A, at a first period of time, the set of bins of an equi-depth histogram may correspond to values of the average number of people n2(t) over time intervals Δt2 such that the plurality of bins respectively corresponds to n2∈ [0, 3], n2∈ (3, 5], n2∈ (5, 8], n2∈ (8, 12], n2∈ (12, 16], and n2∈ (16, 21]. At the first period of time, before the update to the equi-depth histogram, the plurality of primitive histograms may be arranged in two clusters used to generate two aggregated histograms respectively corresponding to n2∈ [0, 8] and n2∈ (8, 21].

However, crowd statistics may change over time, and the electronic processor 38 determines the boundaries of each bin (e.g., the ranges of n2) such that each bin includes an equal amount of data. Therefore, as illustrated in FIG. 11B, at a period of time after the first period of time (e.g., after time interval Δt3), the electronic processor 38 may modify or update the boundaries of the bins such that the plurality of bins respectively corresponds to n2∈ [0, 3], n2∈ (3, 5], n2∈ (5, 7], n2∈ (7, 11], n2∈ (11, 16], and n2∈ (16, 21] to maintain the equi-depth histogram.

After modifying or updating the boundaries of the bins, the electronic processor 38 updates the plurality of primitive histograms according to the changes in bin boundaries of the equi-depth histogram (at block 408). The modification of the boundary between two bins may result in a change of shape of one or more primitive histograms. For example, as illustrated in FIG. 11A, before the histograms are rearranged, a change Δn for an average number of people n2(t) of eight people may be reflected in a primitive histogram corresponding to n2∈ [5, 8]. As illustrated in FIG. 11B, after the histograms are rearranged, a change Δn for an average number of people n2(t) of eight people may be reflected in a primitive histogram corresponding to n2∈ (7, 11].

Based on the updated primitive histograms, the electronic processor 38 updates the primitive histogram clusters (at block 412). The electronic processor 38 compares the plurality of primitive histograms to identify a plurality of clusters, where each of the plurality of clusters includes one or more of the plurality of primitive histograms. The electronic processor 38 determines the primitive histogram clusters based on a similarity of the primitive histograms such that primitive histograms that are similar to one another (e.g., in overall shape or other characteristic) are placed in the same cluster. For example, as illustrated in FIG. 11A, before rearranging the histograms boundaries, the electronic processor 38 may identify two primitive histogram clusters each including three primitive histograms. A first primitive histogram cluster may correspond to a range of n2∈[0, 8], and a second primitive histogram cluster may correspond to a range of n2∈(8, 21].

Figure 11B:
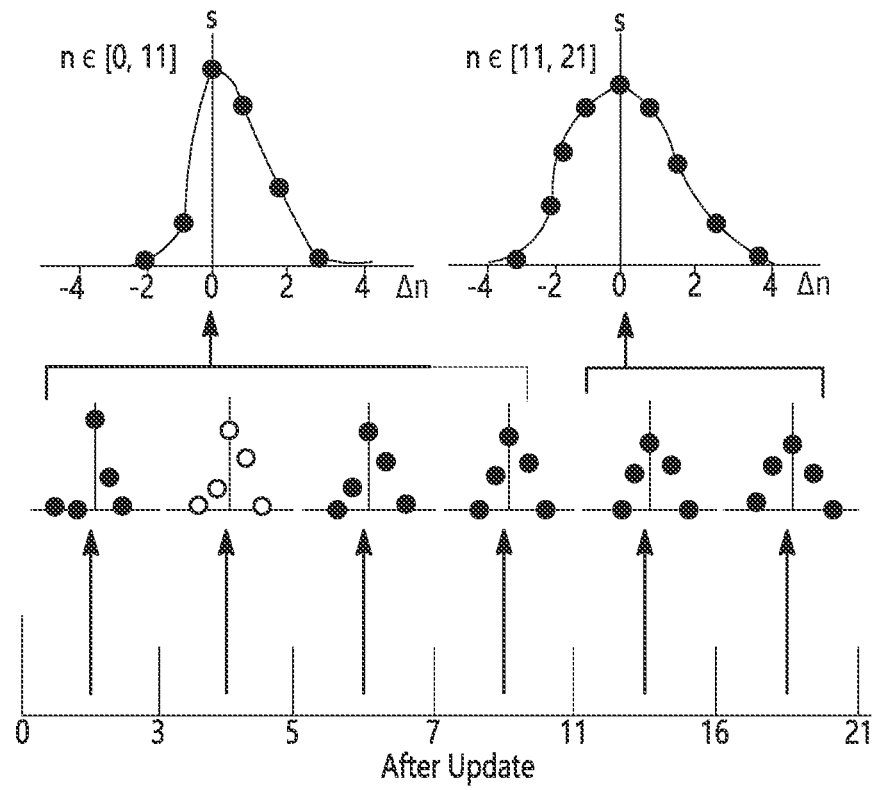
FIG. 11B illustrates a set of histograms generated at a second period of time, according to some aspects.

As illustrated in FIG. 11B, after rearranging the histogram boundaries, the electronic processor 38 may identify two primitive histogram clusters where a first cluster includes four primitive histograms, and a second cluster includes two primitive histograms. The first primitive histogram cluster may correspond to a range of n2∈[0, 11], and the second primitive histogram cluster may correspond to a range of n2∈(11, 21]. In some instances, the number of clusters generated by the electronic processor 38 is predetermined (e.g., as part of the anomaly detection configuration 54). However, the number of primitive histograms included in each cluster may vary. In the illustrated example, the primitive histograms included in a given cluster correspond to adjacent sets of n2. However, in some instances, one or more clusters may include primitive histograms corresponding to non-overlapping disjoint sets of n2. As described above, the electronic processor 38 determines the clusters such that the primitive histograms included in each cluster share similar characteristics.

After updating the primitive histogram clusters, the electronic processor 38 recalculates the plurality aggregated histograms (at block 416). As described above, each aggregated histogram corresponds to a primitive histogram cluster, and is an aggregation (e.g., a sum) of the primitive histograms included in the corresponding cluster. As illustrated in FIG. 11A, before rearranging of histogram boundaries, the plurality of aggregated histograms may include two aggregated histograms respectively corresponding to n2∈[0, 8] and n2∈(8, 21]. As illustrated in FIG. 11B, after rearranging of histogram boundaries, the plurality of aggregated histograms may include two aggregated histograms respectively corresponding to n2∈[0, 11] and n2∈(11, 21].

Referring again to FIG. 6, after determining, for each moment t, the change $\Delta n$ in the average number of people (at block 224), the electronic processor 38 determines, for each moment t, the probability $\rho$ of the change $\Delta n$ (at block 236). The electronic processor 38 determines the probability $\rho$ of the change $\Delta n$ by selecting one of the plurality of aggregated histograms corresponding to the average number of people n2(t) calculated, for example, at block 220 of FIG. 6. Using the selected one of the plurality of aggregated histograms, the electronic processor 38 determines the probability $\rho$ of the change $\Delta n$ in average number of people. For example, the electronic processor 38 uses the bin value of the aggregated histogram for the bin corresponding to the change $\Delta n$ in the number of detected people to determine the corresponding probability $\rho$ associated with that value $\Delta n$.

The electronic processor 38 compares the determined probability $\rho$ with a threshold probability $\rho^*$ and determines whether the probability $\rho$ is less than the threshold probability $\rho^*$ (at block 240). Similar to the threshold probability described above with respect to FIG. 3, the threshold probability $\rho^*$ as used in the method 200 may be a user-defined probability threshold included, for example, in the anomaly detection configuration 54 and indicating a frequency of anomaly occurrence (e.g., crowd growth anomaly occurrence) for the region of interest recorded by the camera 24.

In response to detecting an anomalous crowd growth (YES at block 240), the electronic processor 38 generates an alert indicating that a crowd growth anomaly has occurred (at block 244). The electronic processor 38 provides the alert to, for example, the user device 32 over the network 28, and continues performing the anomaly detection method 200 by, for example, repeating the steps of the method 200. When an anomalous crowd size is not detected (NO at block 240), the electronic processor 38 continues the anomaly detection method 200 by, for example, repeating the steps of the method 200.

As described above, crowd size and change in crowd size algorithms may be used to determine a probability value for each moment of time (e.g., each moment of time t) for each measurement of a number of people (crowd size) or each measurement of a change in the number of people (crowd size change). These histograms, including tail portions, may be normalized such that the probability, determined using the function fitted to the histogram and/or the tail portion of the histogram has the meaning of a probability density function. Such a probability may be the value of a histogram bin corresponding to the measurement or corresponding to a value of the function that fits the histogram (crowd size change) or a tail of the histogram (crowd size).

This probability value by itself, however, does not characterize a degree of abnormality of the measurement, and a user who wants to get anomalies reported to him or her may not be interested in the probability of any given event. For example, for a uniform probability distribution, all events may have a low probability, but only events at the edges of the distribution are anomalous. Thus, instead of a probability itself, the user is interested in how close an event is to the "extremely large" measurements or how far it is from the "normal" measurements. At the same time, the user assumes that anomalies are events that happen rarely, and the frequency of the anomalous event characterizes a level of the event's abnormality. That frequency can be used as a parameter that a user can define according to the user's specific needs. For example, a user may want to get events reported to them as anomalies (on average, in long time intervals, and for stationary situations) once in a day, once in a week, once in a month, or the like and different users may want to receive alerts at different frequencies.

Accordingly, some embodiments described herein may define an anomaly as an event that belongs to the tail of the histogram bounded by a predefined value. This value, considered as a threshold for the measurement number of people (crowd size) or the measurement of the change in the number of people (crowd size change), defines a set of events whose total frequency can be calculated using a cumulative distribution function. In such embodiments, the threshold frequency does not define the frequency of any given event, but rather defines the frequency of all anomalous events reported to a particular user. Accordingly, a probability determined according to the methods described above (crowd size or crowd size change) can be converted or mapped to a frequency (a cumulative frequency calculated using a cumulative distribution function) and, as part of controlling alerts reported to a particular user, compared to the user-specific threshold frequency to determine whether an alert for the event should be reported to the user or whether the event should be dropped or filtered from the user's user interface (dashboard) or other type of anomaly report or messaging.

Figure 12A:
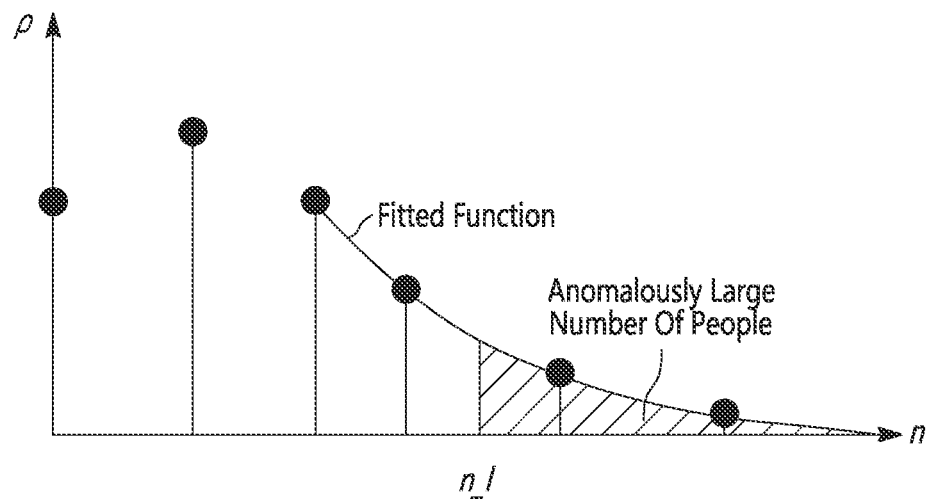
FIG. 12A illustrates an example crowd size histogram, according to some aspects.
Figure 12B:
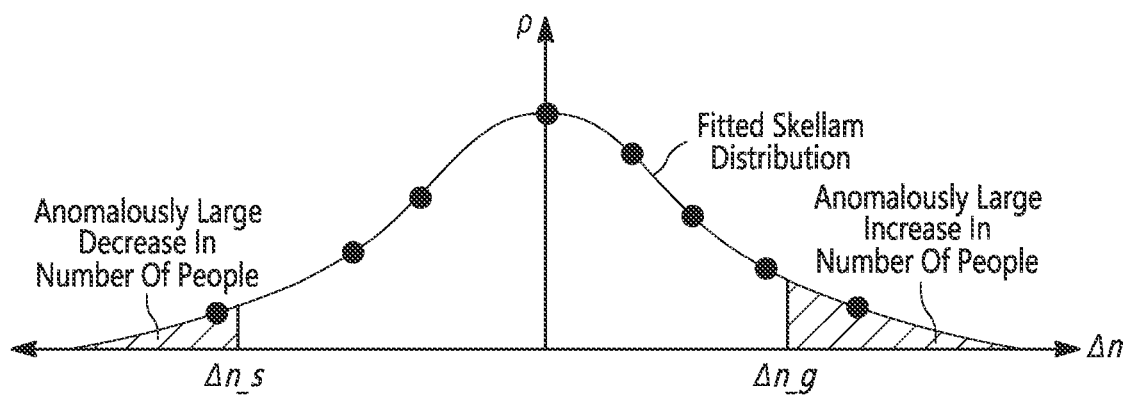
FIG. 12B illustrates an example crowd size change histogram, according to some aspects.

For example, referring now to FIGS. 12A and 12B that respectively illustrate an example crowd size histogram and an example change in crowd size histogram, the electronic processor 38 may map a determined probability of an event to a frequency. The frequency may be a cumulative frequency calculated based on a tail portion of the histogram used to determine the probability for the event. For example, as illustrated in FIG. 12A, the electronic processor 38 may determine a frequency of an event associated with a crowd size (i.e., a determined average number of people n) by determining the cumulative frequency corresponding to the tail portion of the histogram bounded by n. Similarly, as illustrated in FIG. 12B, the electronic processor 38 may determine a frequency that an event associated with a change in crowd size (i.e., a determined change in the average number of people Δn) by determining the cumulative frequency corresponding to the tail portion of the histogram bounded by Δn. As noted above, determining a frequency using a cumulative distribution function defines a frequency of all events in the respective tail portion rather than a frequency of any particular event.

Figure 13:
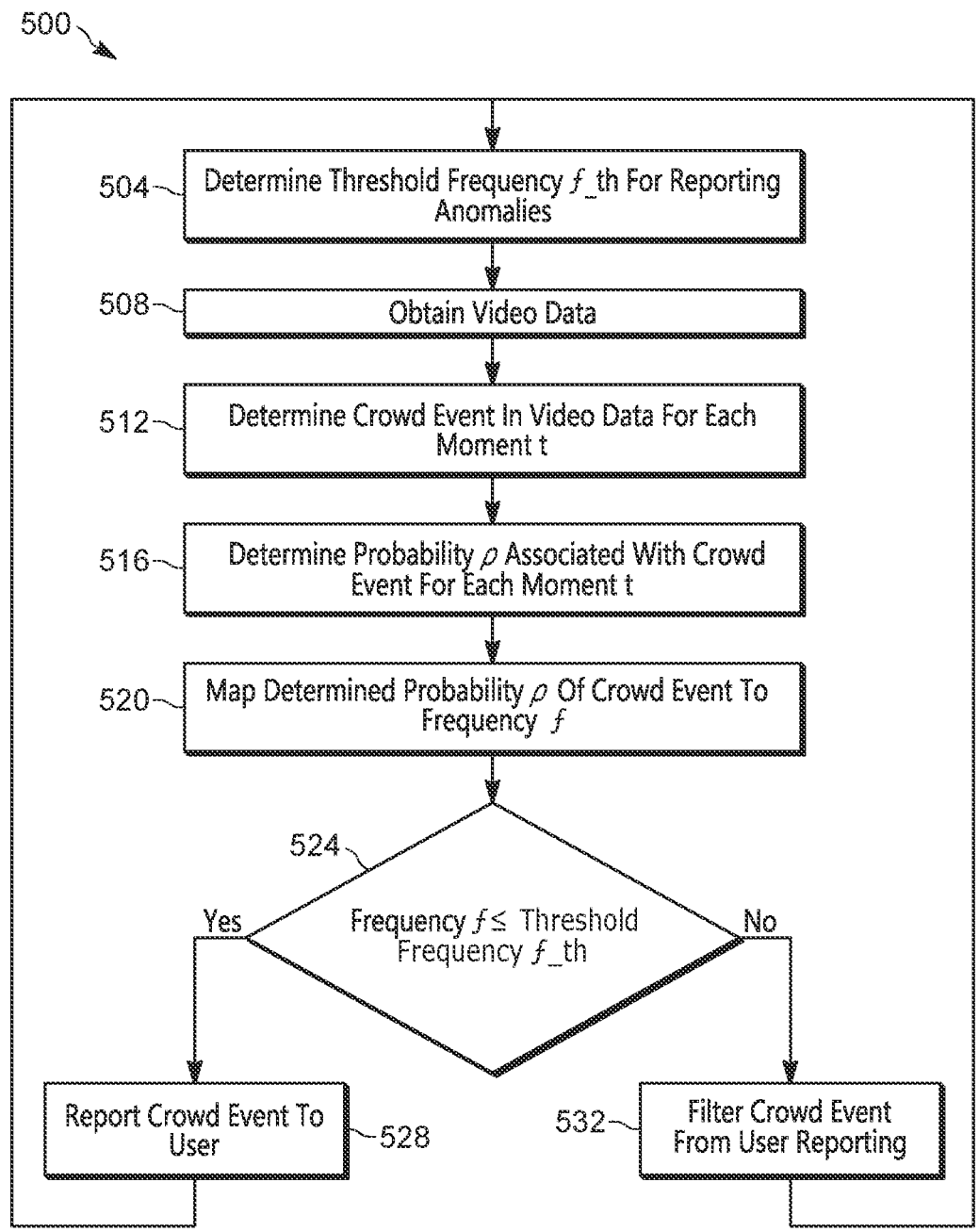
FIG. 13 illustrates an example method for alerting a user of a crowd event anomaly, according to some aspects.

FIG. 13 illustrates an example method 500 performed by, for example, the electronic processor 38, for providing alerts to a user according to a user-defined frequency. The method 500 includes determining a threshold frequency f_th for reporting anomalies (at block 504). The threshold frequency f_th may be a user-defined frequency indicative of the types of events the user is interested in receiving alerts for. For example, the threshold frequency may define a number of occurrences per interval T (for example, a day, a week, a month, or the like) of an event that the user associates as being an anomalous event and, thus, establishes a frequency (on average) at which the user desires to receive alerts. In some instances, the electronic processor 38 determines a default threshold frequency f_th in lieu of a user-defined threshold frequency f_th.

The electronic processor 38 obtains video data of a scene (at block 508) and determines crowd events in the video data for each moment t (at block 512). Crowd events are, for example, measurements of average number of people (e.g., calculated according to blocks 108-116 of the method 100) and/or measurements of change in average number of people (e.g., calculated according to blocks 208-224 of the method 200). The electronic processor 38 determines a probability ρ associated with the crowd event (at block 520). The electronic processor 38 may determine the probability ρ in a manner substantially similar to that of block 124 of the method 100 with respect to crowd size anomaly detection and/or block 236 of the method 200 with respect to change in crowd size anomaly detection.

The electronic processor 38 determines a frequency f of the crowd event by, for example, mapping the probability ρ of the crowd event to a frequency of the set of events defined by the measured crowd event (e.g., the average number of people n and/or the change Δn in average number of people) (at block 520). With respect to a crowd event that is a crowd size detection of n_1 people for a given moment t, the electronic processor 38 may determine the frequency as f=(1−F(n_1)) T/Δt, where F(n_1)) is a cumulative distribution function evaluated at the determined average number of people n_1, and Δt is the time interval between each measurement of average number of people (e.g., each moment t). The cumulative distribution function F is the integral of the probability density function ρ by (or obtained from) the normalized crowd size histogram. Frequency describes, for example, an expected frequency of an event defined by detecting a number of people greater than n_1.

With respect to a crowd event that is a positive change in crowd size (crowd growth) detection of Δn_g people for a given moment t, the electronic processor 38 may determine the frequency as f=(1−F(Δn_g)) T/Δt, where F(Δn_g) is a cumulative distribution function, evaluated at the determined change Δn_g in average number of people, and Δt is the time interval between each measurement of n (e.g., each moment t). The cumulative distribution function F is the integral of the probability density function ρ by (or obtained from) the normalized histogram of crowd size change. Frequency describes, for example, an expected frequency of an event defined by detecting a number of people greater than n_g.

With respect to a crowd event that is a negative change in crowd size (crowd evacuation or a negative crowd growth) detection of Δn_s people for a given moment t, the electronic processor 38 may determine the frequency as f=(F(Δn_s)) T/Δt, where F(Δn_s) is a cumulative distribution function, evaluated at the determined change Δn_s in average number of people, and Δt is the time interval between each measurement of n (e.g., each moment t). The cumulative distribution function F is the integral of the probability density function ρ by (or obtained from) the normalized histogram of crowd size change. Frequency describes, for example, an expected frequency of an event defined by detecting of decrease in the number of people greater than by absolute value or equal to n_s.

In response to determining the frequency f of the crowd event based on the probability ρ, the electronic processor 38 determines whether the determined frequency f is equal to or less than the threshold frequency f_th (at block 524). When the determined frequency f is less than or equal to the threshold frequency f_th, a crowd anomaly alert (i.e., an anomalous crowd size alert and/or an anomalous change in crowd size alert) for the crowd event is provided to the user (at block 528).

In contrast, when the determined frequency f is greater the threshold frequency f_th, the electronic processor 38 filters the crowd event from reporting or anomaly alerting for the user (at block 532). Such events that are filtered from user reporting are still used by the electronic processor 38 to, for example, update crowd size histograms (e.g., according to block 120 of the method 100) or update change in crowd size histograms (e.g., according to blocks 228-232 of the method 200). In some embodiments, the electronic processor 38 may report all events and the user-specified frequency threshold may be applied at a user-facing or edge component of the system to appropriately filter what events reported by the electronic processor 38 are reported to the user (i.e., what events the user is alerted to). As noted above, different users may have different thresholds to allow users to establish different anomaly thresholds and specify such thresholds as a frequency rather than a probability, which may be difficult for a user to define.

Accordingly, in some instances, determining whether a probability ρ exceeds a probability threshold ρ* (e.g., according to block 128 of the method 100 and/or block 240 of the method 200) includes mapping the probability ρ to a frequency f (at block 520) and determining whether the frequency f is less than a threshold frequency f_th (at block 524). However, in other embodiments, the frequency determination described herein may be used in combination with a probability threshold. For example, in some embodiments, a probability threshold may be used to control what events are reported by the system (e.g., as an initial filter to control reporting and bandwidth requirements), wherein the user-specific frequency thresholds may be used to further filter what events are reported or otherwise provided to a particular user. In yet other embodiments, no probability thresholds are used but rather two frequency thresholds are used. In these embodiments, a first frequency threshold may control what events are reported by the system (e.g., events reported immediately as an alarm), and a second frequency threshold may be a user-specific threshold that controls what events are reported or otherwise provided to a particular user.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

What is claimed is:

1. A method for detecting an anomaly in a region of interest of a camera, the method comprising:
capturing video data using an image sensor; and
detecting an anomaly by:
obtaining the video data captured using the image sensor;
determining a number of people detected within each of a plurality of frames of the video data;
for each moment t, determining an average number of people $n1(t)$ over a time interval $(t-\Delta t1, t)$, where $\Delta t1$ is greater than or equal to the moment t;
for each moment t, determining an average number of people $n2(t)$ over a time interval $(t-\Delta t2, t)$, where $\Delta t2$ is greater than or equal to $\Delta t1$;
for each moment t, determining a change $\Delta n$ in an average number of people based on at least one selected from the group consisting of the average number of people $n1(t)$ and the average number of people $n2(t)$;
for each moment t, selecting one of a plurality of first histograms based on the average number of people $n2(t)$;
for each moment t, determining a probability $\rho$ of the change $\Delta n$ in the average number of people based on the selected one of the plurality of first histograms;
determining whether the probability $\rho$ is less than a threshold probability $\rho^*$; and
in response to determining that the probability $\rho$ is less than a threshold probability $\rho^*$, generating an alert indicating that an anomalous crowd size change is detected.

2. The method of claim 1, further comprising:
for each non-overlapping time interval $\Delta t1$, updating one of a plurality of second histograms based on the average number of people $n2(t)$ over the time interval $(t-\Delta t2, t)$ and the change $\Delta n$ by:
assigning the change $\Delta n$ to one of a plurality of bins based on the average number of people $n2(t)$ over the time interval $(t-\Delta t2, t)$, wherein each of the plurality of bins is associated with a non-overlapping range of values of the average number of people $n2(t)$ over a plurality of time intervals $\Delta t2$;
updating an equi-depth histogram with the average number of people $n2(t)$ over the time interval $(t-\Delta t2, t)$, where the equi-depth histogram includes the plurality of bins;
selecting one of the plurality of second histograms based on the assigned one of the plurality of bins, wherein each of the plurality of second histograms is associated with one of the plurality of bins; and
updating the selected one of the plurality of second histograms with the change $\Delta n$ in the average number of people, wherein each of the plurality of first histograms is an aggregation second histograms included in one of a plurality of non-overlapping clusters of second histograms,
wherein histograms included in the plurality of second histograms are a different type of histogram than histograms included in the plurality of first histograms.

3. The method of claim 2, further comprising:
for each non-overlapping time interval $\Delta t3$ where $\Delta t3$ is greater than or equal to $\Delta t1$, rearranging boundaries of the plurality of first histograms by:
updating the equi-depth histogram by modifying the non-overlapping ranges of values of the average number of people $n2(t)$ associated with the plurality of bins such that each bin includes an equal amount of data;
updating the plurality of second histograms according to modifications to the non-overlapping ranges of values of the average number of people $n2(t)$ associated with the plurality of bins such that each of the plurality of second histograms is associated with one of the plurality of bins;
updating the plurality of non-overlapping clusters of second histograms based on changes to the plurality of second histograms; and
updating the plurality of first histograms based on changes to the plurality of non-overlapping clusters of second histograms.

4. The method of claim 3, wherein each of the plurality of second histograms is included in one of the plurality of non-overlapping clusters of second histograms.

5. The method of claim 1, wherein each moment t includes a predetermined number of frames.

6. The method of claim 1, further comprising smoothing the number of people detected in each of the plurality of frames of the video data over each moment t by determining a median number of people detected in each frame over the moment t or by averaging the number of people detected in each frame over the moment t.

7. A video security system comprising:
an image sensor configured to capture video data; and
an electronic processor configured to detect an anomaly by:
obtaining the video data captured using the image sensor;
determining a number of people detected in each of a plurality of frames of the video data;
for each moment t, determining an average number of people n over a time interval $(t-\Delta t1, t)$, where $\Delta t1$ is greater than or equal to the moment t;
for each non-overlapping time interval $\Delta t1$, updating a histogram based on the average number of people for the time interval $\Delta t1$;
at each moment t, determining a probability $\rho$ associated with the average number of people n over the time interval $(t-\Delta t1, t)$ using the histogram; and
in response to determining that the probability $\rho$ of the average number of people n over the time interval $(t-\Delta t1, t)$ is less than a threshold probability $\rho^*$, generating an alert indicating that an anomalous crowd size is detected.

8. The video security system of claim 7, wherein each moment t is approximately 1 second.

9. The video security system of claim 7, wherein $\Delta t1$ is a user-defined value.

10. The video security system of claim 7, wherein $\Delta t1$ is between approximately 0.3 minutes and approximately 2 minutes.

11. The video security system of claim 7, wherein the electronic processor is configured to provide the alert to a user interface.

12. The video security system of claim 7, wherein the electronic processor is further configured to:
preprocess the video data by smoothing the number of people detected in each of the plurality of frames of the video data over each moment t.

13. The video security system of claim 7, wherein the electronic processor is configured to fit a tail portion of the histogram to the decay function.

14. The video security system of claim 13, wherein the decay function is an exponential decay function.

15. The video security system of claim 13, wherein the electronic processor is configured to, using the decay function, determine a probability ρ associated with an average number of people n that has not been recorded to the histogram.

16. The video security system of claim 7, wherein each moment t includes a predetermined number of frames.

17. The video security system of claim 16, wherein the electronic processor is configured to smooth the number of people detected in each of the plurality of frames of the video data over each moment t by determining a median number of people detected in each frame over the moment t or by averaging the number of people detected in each frame over the moment t.

18. A method for detecting an anomaly in a region of interest of a camera, the method comprising:
capturing video data using an image sensor; and
detecting an anomaly by:
obtaining the video data captured using the image sensor;
determining a number of people detected within each of a plurality of frames of the video data;
for each moment t, determining an average number of people n1(t) over a time interval (t−Δt1, t), where Δt1 is greater than or equal to the moment t;
for each moment t, determining an average number of people n2(t) over a time interval (t−Δt2, t), where Δt2 is greater than or equal to Δt1;
for each moment t, determining a change Δn in an average number of people based on at least one selected from the group consisting of the average number of people n1(t) and the average number of people n2(t);
for each moment t, selecting one of a plurality of first histograms based on the average number of people n2(t);
for each moment t, determining a probability ρ of the change Δn in the average number of people based on the selected one of the plurality of first histograms;
determining a frequency f of the change Δn in the average number of people based on the probability ρ;
determining whether the frequency f is less than or equal to a threshold frequency f_th;
in response to determining that the frequency f is less than or equal to a threshold frequency f_th, generating an alert indicating that an anomalous crowd size change is detected.

19. The method of claim 18, wherein the threshold frequency f_th is a user-selected frequency threshold.

20. The method of claim 18, wherein,
when Δn is positive, the frequency f is defined as f=(1−F(Δn))T/Δt1,
when Δn is negative, the frequency f is defined as f=(F(Δn))T/Δt1,
where F(Δn) is a cumulative distribution function corresponding to a probability density distribution function obtained from the selected one of the plurality of first histograms evaluated at Δn, and T is a time interval defining a measurement unit for the frequency f.

21. A video security system comprising:
an image sensor configured to capture video data; and
an electronic processor configured to detect an anomaly by:
obtaining the video data captured using the image sensor;
determining a number of people detected in each of a plurality of frames of the video data;
for each moment t, determining an average number of people n over a time interval (t−Δt1, t), where Δt1 is greater than or equal to the moment t;
for each non-overlapping time interval Δt1, updating a histogram based on the average number of people for the time interval Δt1;
at each moment t, determining a probability ρ associated with the average number of people n over the time interval (t−Δt1, t) using the histogram; and
determining a frequency f of the average number of people n based on the probability ρ;
determining whether the frequency f is less than or equal to a threshold frequency f_th;
in response to determining that the frequency f is less than or equal to a threshold frequency f_th, generating an alert indicating that an anomalous crowd size is detected.

* * * * *